United States Patent
O'Reilly (10) Patent No.: US 12,327,563 B2
(45) Date of Patent: Jun. 10, 2025

(54) AUTOMATIC AUDIO EDITOR SOFTWARE FOR INTERVIEWS AND RECORDED SPEECH

(71) Applicant: Kenneth O'Reilly, Grover Beach, CA (US)

(72) Inventor: Kenneth O'Reilly, Grover Beach, CA (US)

( * ) Notice: Subject to any disclaimer, the term of this patent is extended or adjusted under 35 U.S.C. 154(b) by 141 days.

(21) Appl. No.: 17/184,271

(22) Filed: Feb. 24, 2021

(65) Prior Publication Data

US 2021/0280192 A1 Sep. 9, 2021

Related U.S. Application Data

(60) Provisional application No. 62/984,610, filed on Mar. 3, 2020.

(51) Int. Cl.
*G10L 15/26* (2006.01)
*G06Q 10/1053* (2023.01)
*G10L 25/54* (2013.01)

(52) U.S. Cl.
CPC .......... *G10L 15/26* (2013.01); *G06Q 10/1053* (2013.01); *G10L 25/54* (2013.01)

(58) Field of Classification Search
CPC ......... G10L 15/26; G10L 25/54; G06Q 10/10; G06Q 10/1053
See application file for complete search history.

(56) References Cited

U.S. PATENT DOCUMENTS

| | | | |
|---|---|---|---|
| 10,440,169 B1* | 10/2019 | Gordon | G06K 9/00 |
| 2005/0210394 A1* | 9/2005 | Crandall | G06F 9/00 715/752 |
| 2006/0218031 A1* | 9/2006 | Weinberg | G07G 1/00 705/10 |
| 2012/0324353 A1* | 12/2012 | Torbey | G06F 3/048 715/716 |
| 2018/0054526 A1* | 2/2018 | Carper | H04M 3/533 |
| 2018/0165723 A1* | 6/2018 | Wright | G06Q 30/02 |

* cited by examiner

*Primary Examiner* — Richemond Dorvil
*Assistant Examiner* — Ethan Daniel Kim
(74) *Attorney, Agent, or Firm* — Fitch, Even, Tabin & Flannery LLP (57) ABSTRACT

Systems and methods for audio processing are described. The system may include a display; a user input device; an audio communications terminal; a recording medium; a tagging system for tagging each of the messages recorded on the recording medium as a function of a question with which each of the messages recorded on the recording medium is associated; and a processor comprising code for: initiating one of the questions of the plurality of questions; displaying the one of the questions of the plurality of questions, having been initiated, on the display; recording via the audio communications terminal audio for a respective response associated with the one of the questions of the plurality of questions, having been initiated; directing the tagging system to tag the response associated with the one of the questions of the plurality of questions; and repeating the steps of each of the plurality of questions.

18 Claims, 10 Drawing Sheets

AUTOMATIC AUDIO EDITOR SOFTWARE FOR INTERVIEWS AND RECORDED SPEECH

This application claims the benefit of U.S. Provisional Application No. 62/984,610, filed Mar. 3, 2020, for AUTOMATIC AUDIO EDITOR SOFTWARE FOR INTERVIEWS AND RECORDED SPEECH which is incorporated in its entirety herein by reference.

BACKGROUND OF THE INVENTION

1. Field of the Invention

The present invention relates generally to audio processing, and more specifically to segmenting an audio recording.

2. Discussion of the Related Art

Various systems and processes are known in the art for processing audio information. One application of audio processing technology is to record interviews. An interview may include a series of questions provided by one person, and corresponding responses provided by another person.

In many cases, it is useful to distinguish between the questions being asked, and the associated responses. Manually distinguishing these portions of an interview can be costly and time consuming. Therefore, there is a need in the art for audio processing systems that can efficiently segment an audio recording.

SUMMARY

A system is described comprising a display; a user input device; an audio communications terminal for sending and receiving audio messages; a recording medium coupled to the audio communications terminal for recording audio messages received via the audio communications terminal; a tagging system coupled to the recording medium for tagging each of the messages recorded on the recording medium as a function of a question with which each of the messages recorded on the recording medium is associated; and a processor coupled to the display, user input device, recording medium and tagging system, wherein the processor comprises code for performing the following steps for each question of a plurality of questions: initiating, by a user, one of the questions of the plurality of questions; displaying the one of the questions of the plurality of questions, having been initiated, on the display; recording via the audio communications terminal audio for a respective response associated with the one of the questions of the plurality of questions, having been initiated; directing the tagging system to tag the response associated with the one of the questions of the plurality of questions; and repeating the steps of each of the plurality of questions.

A method, apparatus, non-transitory computer readable medium, and system for segmenting an audio recording are described. Embodiments of the method, apparatus, non-transitory computer readable medium, and system may initiate a question of the plurality of questions, display the question on the display, record audio for a response associated with the question, and tag the response associated with the question. The steps may be repeated for each of a set of questions.

DETAILED DESCRIPTION

The present disclosure describes systems and methods for audio processing, and more specifically, for segmenting an audio recording. Certain embodiments relate to segmenting audio information corresponding to an interview between a first user (the interviewer) and a second user (the interviewee).

Conventionally, a human may carefully edit an audio interview to splice each question/answer group into a separate audio file. These files may be manually produced into an audio CD with associated PDF of notes, or packaged into a variety of other end products. However, this method to process, record, and document an interview is time-consuming and expensive. Therefore, the present disclosure provides systems and methods for automatically segmenting audio based on interview questions or other predetermined segments.

For example, in one embodiment interview questions may be read from a screen (while recording the interview). To proceed to the next question, the interviewer provides an indication to proceed (e.g., clicks on a screen) to view the next question. This indication may also record an inaudible tone (i.e., a tone on the recording that is not heard by the interviewee).

Each "tone" may correspond to a hidden marker to allow for automatically splicing the audio of each recorded question/answer. The tone may enable automatic creation of separate tracks (i.e., audio files) for each question and store the on-screen text question associated with the corresponding audio file.

Alternatively, in accordance with various embodiments in accordance with the present description, a hidden marker may be in the form of inaudible data, e.g., metadata, such as a timestamp, or bookmark, that is recorded along with the audio files, or in the form of inaudible data, e.g., metadata, such as a timestamp, or bookmark, that is recorded in a separate file, e.g., a markup language file, from the audio files.

The following description is not to be taken in a limiting sense but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
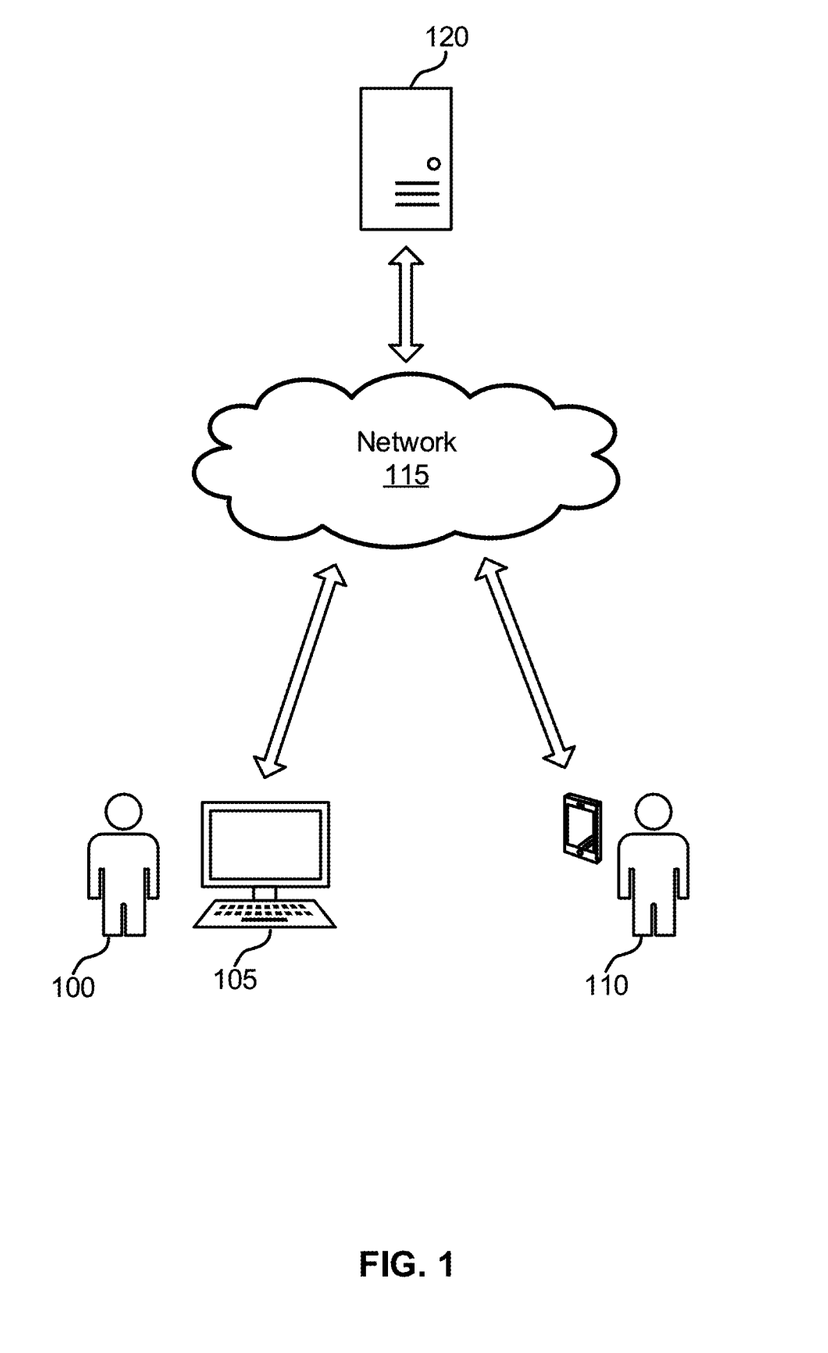
FIG. 1 shows an example of audio processing system according to aspects of the present disclosure.

FIG. 1 shows an example of an audio processing system according to aspects of the present disclosure. The example shown includes user 100, user terminal 105, subject 110, network 115, and server 120.

According to one example, the user 100 conducts an interview based on questions displayed on the terminal 105. The subject 110 responds to the interview (either in person, or via a telecommunications device). In some examples, a server 120 may process audio information associated with the interview. In other examples, the audio processing may be performed on the user terminal 105. Communication between the user 100, the subject 110, and the server 120 may be transmitted via the network 115.

According to various embodiments, an inaudible tone may be generated that enables processing of audio information associated with an interview (or other segmentable audio). Using an inaudible tone may enable more efficient processing of the interview even if complications arise during the recording. For example, the subject 110 may request to skip a question. This can make it very difficult to splice the audio files and keep them associated with the correct question if it is done manually.

Thus, in some embodiments, a recording application on the user terminal 105 may include several buttons on each question screen. One button may correspond to finishing a question (and indicate a transition to the next question). Another button may indicate that a question is to be skipped. Examples of buttons that may be displayed on each question screen are shown below in FIG. 10.

In one embodiment of the present disclosure, the audio processing system may be used to conduct life history interviews. For example, the user 100 may interview a subject 110 about the subject's life experience and may use the audio files to create life history products.

In some cases, the audio processing system may also be used for self-interviews. A user 100 may choose to select their own questions, record each answer and then select from a variety of ways to publish the product. In some examples, a self-documented interview product could be created and kept private (e.g., to be shared with loved ones only after they pass away).

Once an interview is complete and the audio files are segmented by question, a variety of products may be created based on the segmented interview. Example products include MP3 audio files of interview (i.e., just audio), audio files plus a text of the associated questions, a video slideshow (based on an option to upload associated photos and overlay the text question plus add background music, including background photos like scenery or photos of the interviewee), downloadable video, video on a DVD, video loaded onto a digital photo frame, or a custom memory book based on an audio transcription, such as an automated audio transcription.

In a human resources application, the audio processing system may be used by a person who conducts an initial phone interview with potential candidates for employment. Conventionally, the interviewer is a person at a company who screens many candidates with phone interviews on behalf of a hiring manager. The hiring manager may supply some questions to be asked of the candidates in the interview, but the hiring manager must rely on the recommendations given to them by the person who conducted the phone interview. The hiring manager selects who will make it to the next level of the hiring process. Thus, in some cases, candidates advance because they are picked by somebody other than the actual hiring manager.

According to an embodiment of the present disclosure, phone interviews may be conducted in the same manner, except the interviewer (i.e., user 100) reads each question from a computer screen (in a web browser of the user terminal 105) as the entire audio call is recorded. The hiring manager may select questions that will have greater weight in the hiring decision.

When a phone interview is completed, the hiring manager may quickly listen to any key answers associated with the selected questions. This method allows a hiring manager to briefly review and decide which candidates should advance to in-person interviews. Thus, the hiring manager can have more direct information from the interview to make hiring decisions.

Other applications of the audio processing system of FIG. 1 include facilitating practice interviews for job candidates, generating podcasts, enabling users to hear answers to specific interview questions, conducting self-interview with automatic tagging of audio responses, real-time emoticon tagging for diagnostic or therapeutic purposes, (e.g., a patient may answer a doctor's questions periodically, and the doctor can listen to answers to questions over time), searching for audio transcriptions for keywords in a patient's audio medical record (e.g., for research or clinical trials), monitoring symptoms over time, and searching audio transcriptions for keywords in a plurality or patient records.

User terminal 105 may be an example of, or include aspects of, the corresponding element or elements described with reference to FIG. 2.

Figure 2:
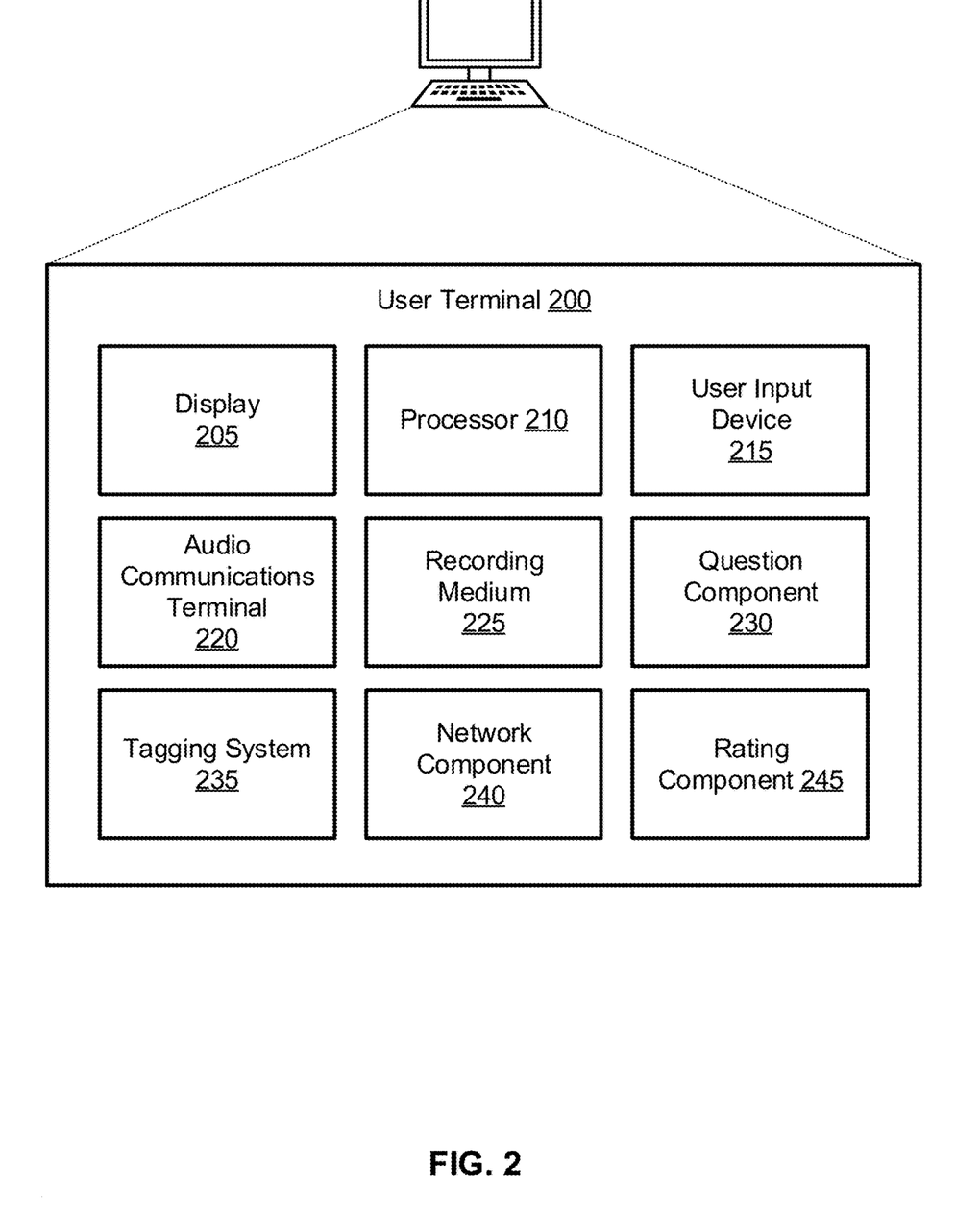
FIG. 2 shows an example of a user terminal according to aspects of the present disclosure.

FIG. 2 shows an example of a user terminal 200 according to aspects of the present disclosure. User terminal 200 may be an example of the corresponding element described with reference to FIG. 1. User terminal 200 may include display 205, processor 210, user input device 215, audio communications terminal 220, recording medium 225, question component 230, tagging system 235, network component 240, and rating component 245.

A processor 210 may include an intelligent hardware device, (e.g., a general-purpose processing component, a digital signal processor DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof).

In some cases, the processor 210 may be configured to operate a memory array using a memory controller. In other cases, a memory controller may be integrated into processor 210. The processor 210 may be configured to execute computer-readable instructions stored in a memory to perform various functions. In some examples, a processor 210 may include special purpose components for modem processing, baseband processing, digital signal processing, or transmission processing. In some examples, the processor 210 may comprise a system-on-a-chip.

In some examples, the recording medium 225 may comprise a computer memory storing information for various programs and applications on a computing device. The storage may also include data for running an operating system. The memory may include both volatile memory and non-volatile memory. Volatile memory may include random access memory (RAM), and non-volatile memory may include read-only memory (ROM), flash memory, electrically erasable programmable read-only memory (EEPROM), digital tape, a hard disk drive (HDD), and a solid-state drive (SSD). Memory may include any combination of readable and/or writable volatile memories and/or non-volatile memories, along with other possible storage devices.

Display 205 may include any suitable component for displaying data to a user. For example, display 205 may display a question to the user. For example, display 205 may display a question display to the interviewer(user) such as that shown below in FIG. 10.

Audio communications terminal 220 may record audio for a response associated with the question. The audio communications terminal 220 may place an audio call to the subject 110. In some embodiments the audio communications terminal 220 is configured to place the call using VoIP. Audio communications terminal 220 is configured to receive the audio from the audio call. Subject 110 has a device for receiving an audio call (e.g. a telephone or a computing device configured for audio calls). Audio communications terminal 220 may also record audio for the question, where repeating the steps includes repeating the recording of the audio for the question. In some examples, the recording includes continuously recording the audio for each respective response associated with each of the set of questions. In one embodiment, one or more functions of the audio communications terminal 220 are performed by one or more audio communications applications configured to be executed by the processor 210. In some embodiments at least one audio communications application is a script executed by a web browser running on the processor 210. In another embodiment, one or more functions of the audio communications terminal are performed by one or more audio communications applications configured to be executed by the server 120. In some embodiments the audio communications terminal 220 is in communication with other hardware and/or software components of the user terminal 200 or peripheral components coupled to audio communications terminal 220. For example, the audio communications terminal 220 may be in communication with and utilize a microphone configured to receive audio from the user 100 during the audio call. In some embodiments the audio recording is stored on at least one of the terminal 105 and the server 120.

Figure 10:
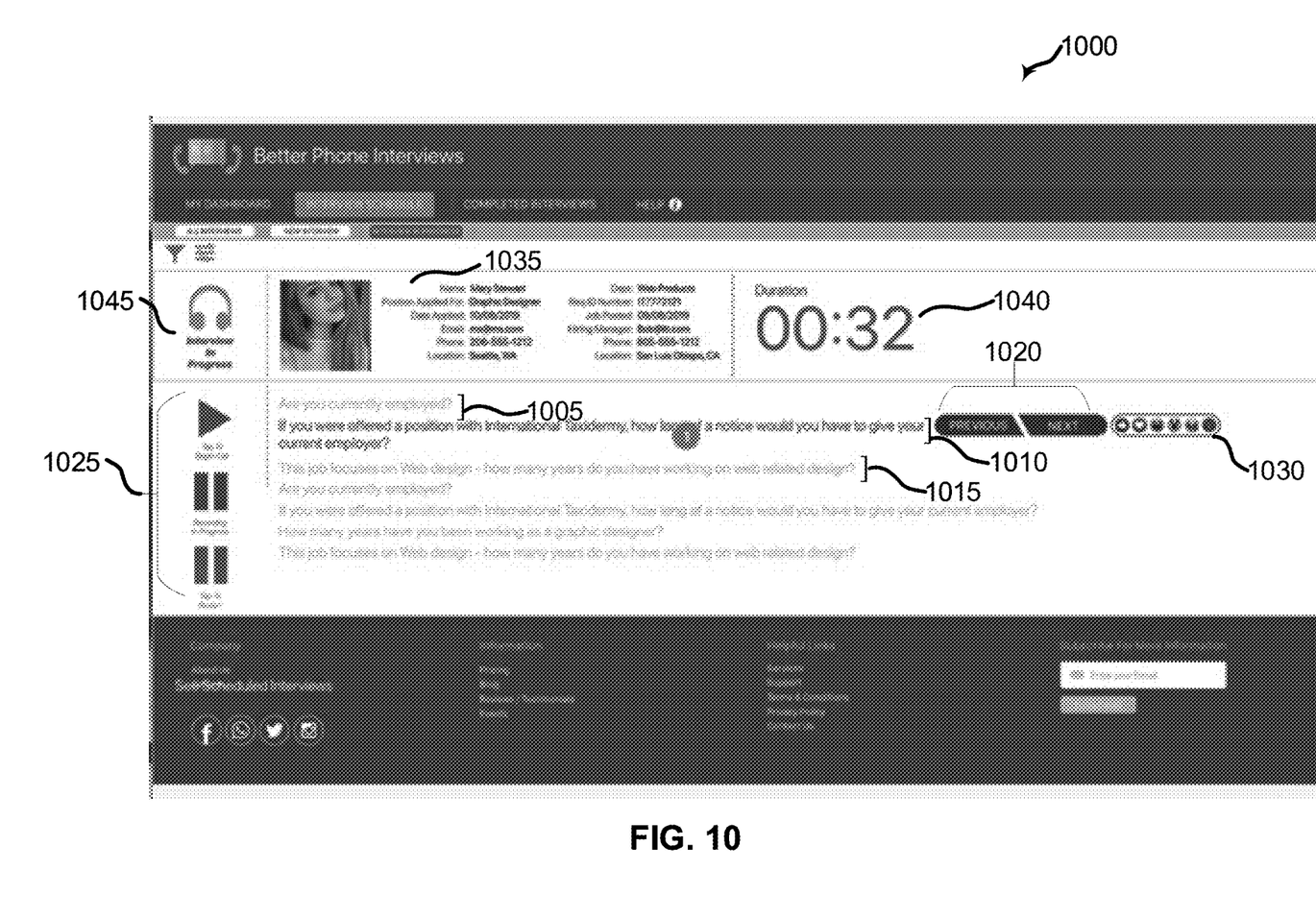
FIG. 10 shows an example of a graphical display interface during the audio recording process according to aspects of the present disclosure.

Question component 230 may initiate a question from the set of questions. For example, question component 230 may receive input from a user and send the question component for display on the display 205. In some embodiments the question is graphically indicated as being an active question in a list of questions, as shown in FIG. 10. In some embodiments the question component 230 is configured to display the question in a web browser running on the terminal 200. In some embodiments one or more functions of the question component 230 are performed by one or more question component applications configured to be executed by the processor 210. In some embodiments at least one question component application is a script executed by a web browser running on the processor 210. In some embodiments the question component 230 comprises one or more question component applications running on the server 120.

Tagging system 235 may tag the response associated with the question. In some examples, the response is tagged using a markup language index generator for generating a markup language index including tagging information. In some embodiments the functions of the tagging system 235 are performed by one or more tagging system applications configured to be executed by the processor 210. In some embodiments at least one tagging system application is a script executed by a web browser running on the processor 210. In some embodiments the tagging system 235 comprises one or more tagging system applications running on the server 120. In some embodiments the tag is stored on at least one of the terminal 105 and the server 120.

Network component 240 manages communications with a network. For example, network component 240 may send an audio message associated with the question, where repeating the steps includes repeating the audio message. Network component 240 may also receive an input from a user, where the audio is recorded in response to receiving the input, or where the response is tagged in response to receiving the input. Network component 240 may also transmit the response to a reviewer system. In some embodiments the network component 240 comprises hardware and/or software configured to perform the network component functions. In some embodiments the network component 240 is configured to send over the network 115 to the server 120 any of the inputs received at the terminal 200 (e.g. the recorded audio). In some embodiments the network component 240 is configured to send over the network 115 to the server 120 any data resulting from functions performed by the terminal 200 (e.g. response tags based on user input). In some embodiments the network component 240 is configured to receive data sent over the network 115 by the server 120 (e.g. questions).

Rating component 245 may receive a rating from a user for the response. The rating may be received after a last question is received or after a last response is received. In some embodiments a rating may be received for each of one or more questions. In some cases, the rating includes an emoticon or an emoji. In some embodiments the rating component 245 is configured to receive the rating via a web browser running on the terminal 200. In some embodiments the rating component is configured to display a choice of emoticons or emojis on a web browser and receive input from the user to select one of the displayed emoticons or emojis, whereby the rating component 245 associates the selection with the response (or the question). In some embodiments the functions of the rating component 245 are performed by one or more rating component applications configured to be executed by the processor 210. In some embodiments at least one rating component application is a script executed by a web browser running on the processor 210. In some embodiments the rating component 245 comprises one or more rating component applications running on the server 120. In some embodiments the tag is stored on at least one of the terminal 105 and the server 120.

The user terminal 200 may also comprise a search engine configured to search for at least one keyword in a transcription generated in response to said automatically transcribing. In some embodiments the search engine comprises a script executed by a web browser running on the processor 210, whereby the web browser communicates with a search engine via the network 115.

Figure 3:
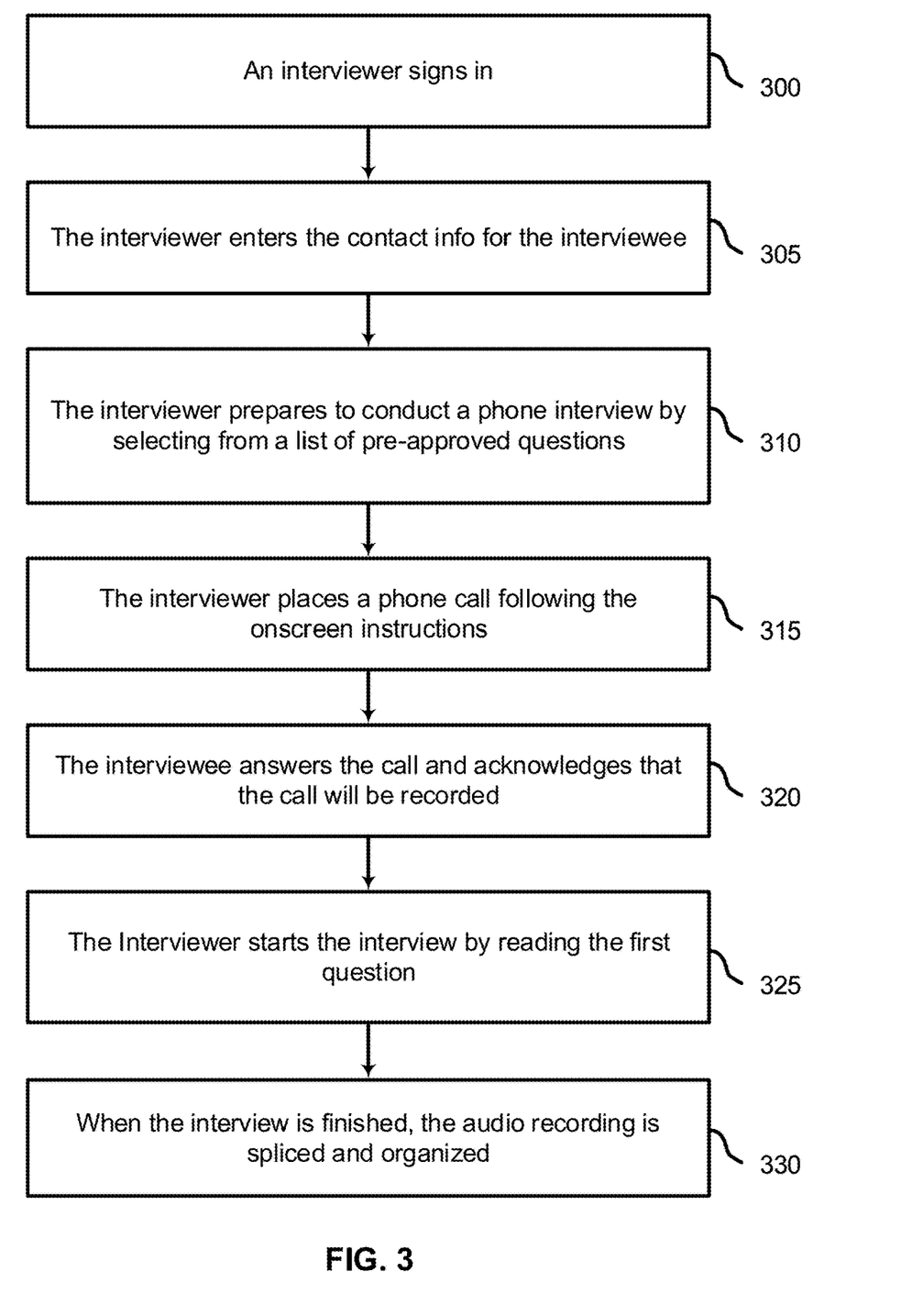
FIG. 3 shows an example of an interview process according to aspects of the present disclosure.

FIG. 3 shows an example of an interview process according to aspects of the present disclosure. In some examples, these operations may be performed using a system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 300, an interviewer signs in (e.g., using a web browser). In some cases, the operations of this step may be performed by a user as described with reference to FIG. 1.

At operation 305, the interviewer enters the contact info for the interviewee. In some embodiments, the contact info is entered using a web browser interface of the system. The contact information is sent to and stored by the server 120. In some cases, the operations of this step may be performed by a user as described with reference to FIG. 1.

At operation 310, the interviewer (user) prepares to conduct a phone interview by selecting from a list of pre-approved questions. In some embodiments the questions are selected using a web browser interface of the system. The interviewer may also have the ability to add new questions into the list of questions to be asked of the interviewee. In some cases, the operations of this step may be performed by a user as described with reference to FIG. 1.

At operation 315, the interviewer places a phone (audio) call to the candidate following the onscreen instructions. In some embodiments, the call may be a video call. In some embodiments, the audio call is a VoIP call. In some embodiments, the audio call is placed via a user interface of a web browser. In some cases, the operations of this step may be performed by a user as described with reference to FIG. 1.

At operation 320, the interviewee answers the call and is given an indication that the call will be recorded. The interviewee acknowledges that the call will be recorded. In some cases, the operations of this step may be performed by a subject 110 as described with reference to FIG. 1.

At operation 325, the interviewer starts the interview by reading the first question from the web page as displayed on the web browser on the display of the terminal in front of them. Once the interviewee finishes answering the question, then the interviewer clicks a button on the web browser display to indicate that the first question/response is finished and to advance to the next page allowing the interviewer to see the question, read the question, and have the interviewee respond to the question. When the interviewer selects the button, the system tags and identifies the previous audio segment as associated with the previous question. A new segment identification is started with the next question. This process is repeated until all questions are answered. As a result, an audio segment of the audio call is associated with each question. In some cases, the operations of this step may be performed by a user as described with reference to FIG. 1.

At operation 330, when the interview is finished, the audio recording is automatically spliced and organized using the identified audio segments (e.g., on a web page to allow for the sharing of individual recorded questions and answers). The system may also be configured to transcribe one or more audio segments and display one or more of the transcribed segments.

This scenario gives a hiring manager (who did not conduct the phone interview), the ability to quickly listen to the best answers of key questions and then decide who they want to meet with in-person. Conventionally, the hiring manager had to rely on the advice of the interviewer to learn which candidates might be best to be invited for the in-person interview.

Figure 4:
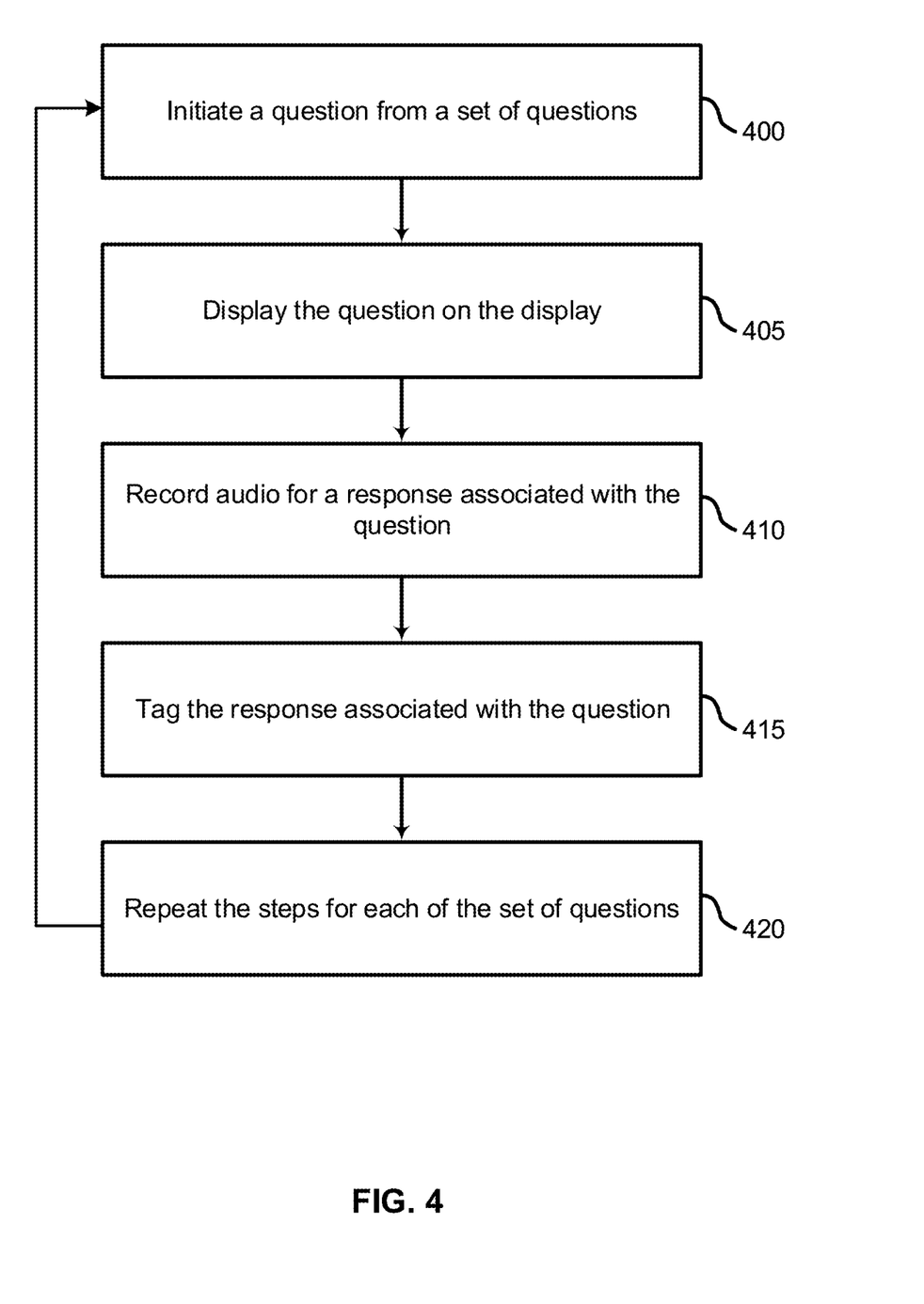
FIG. 4 shows an example of a process for processing an audio recording according to aspects of the present disclosure.

FIG. 4 shows an example of a process for processing an audio recording according to aspects of the present disclosure. In some examples, these operations may be performed by a system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 400, a user initiates a question of the set of questions. In some cases, the operations of this step may be performed or detected by a question component as described with reference to FIG. 2.

At operation 405, the system displays the question on the display. In some cases, the operations of this step may be performed by a display as described with reference to FIG. 2.

At operation 410, the system records audio for a response associated with the question. In some cases, the operations of this step may be performed by an audio communications terminal as described with reference to FIG. 2.

At operation 415, the system tags the response associated with the question. In some cases, the operations of this step may be performed by a tagging system as described with reference to FIG. 2.

At operation 420, the system repeats the steps for each of the set of questions.

Figure 5:
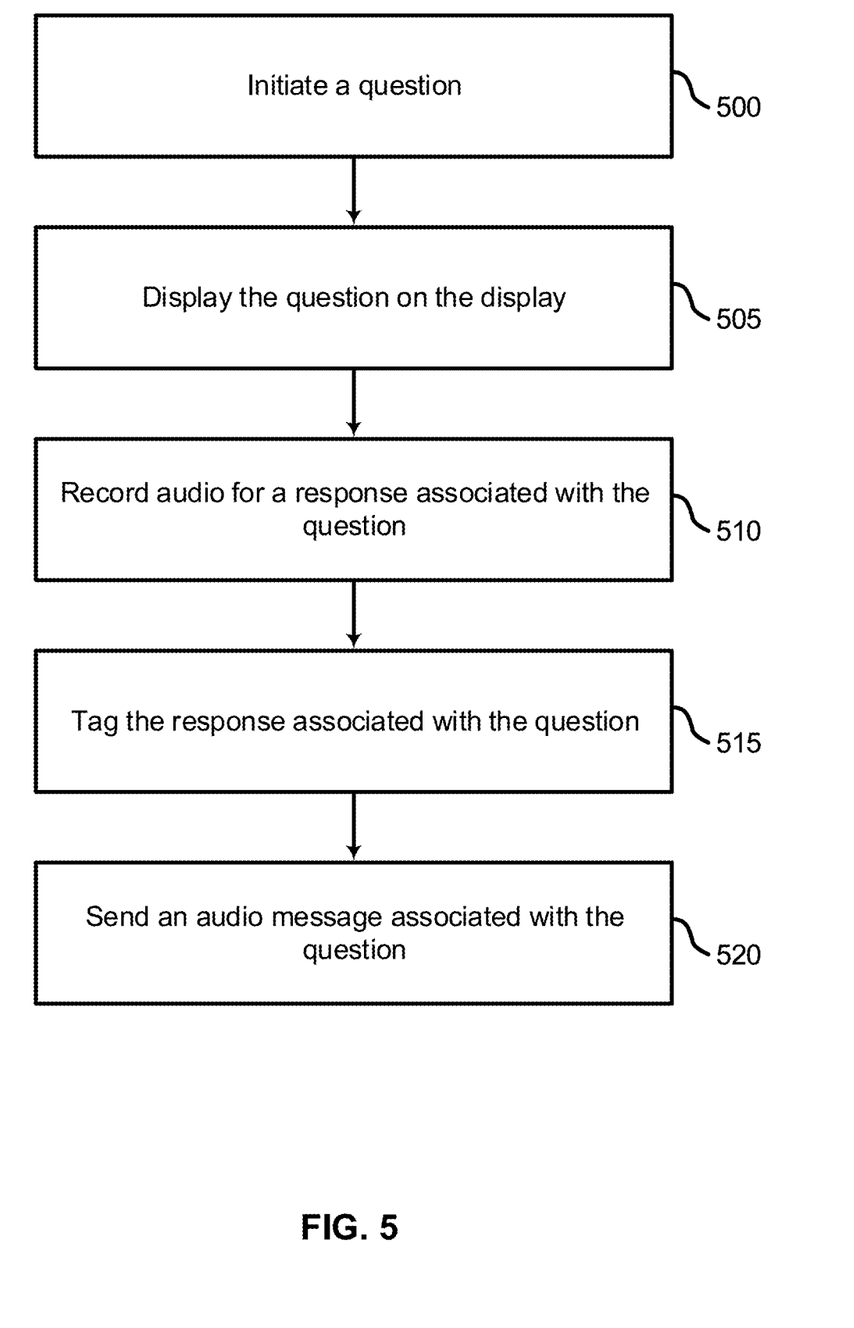
FIGS. 5 through 9 show examples of an audio recording process according to aspects of the present disclosure.

FIG. 5 shows an example of an audio recording process according to aspects of the present disclosure. Specifically, FIG. 5 illustrates an example embodiment in which an audio processing system sends an audio message associated with each question (e.g., of an interview).

In some examples, these operations may be performed by a system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 500, a user initiates a question of the set of questions. In some cases, the operations of this step may be performed or detected by a question component as described with reference to FIG. 2.

At operation 505, the system displays the question on the display. In some cases, the operations of this step may be performed by a display as described with reference to FIG. 2.

At operation 510, the system records audio for a response associated with the question. In some cases, the operations of this step may be performed by an audio communications terminal as described with reference to FIG. 2.

At operation 515, the system tags the response associated with the question. In some cases, the operations of this step may be performed by a tagging system as described with reference to FIG. 2.

At operation 520, the system sends an audio message associated with the question. In some cases, the operations of this step may be performed by a network component as described with reference to FIG. 2.

Figure 6:
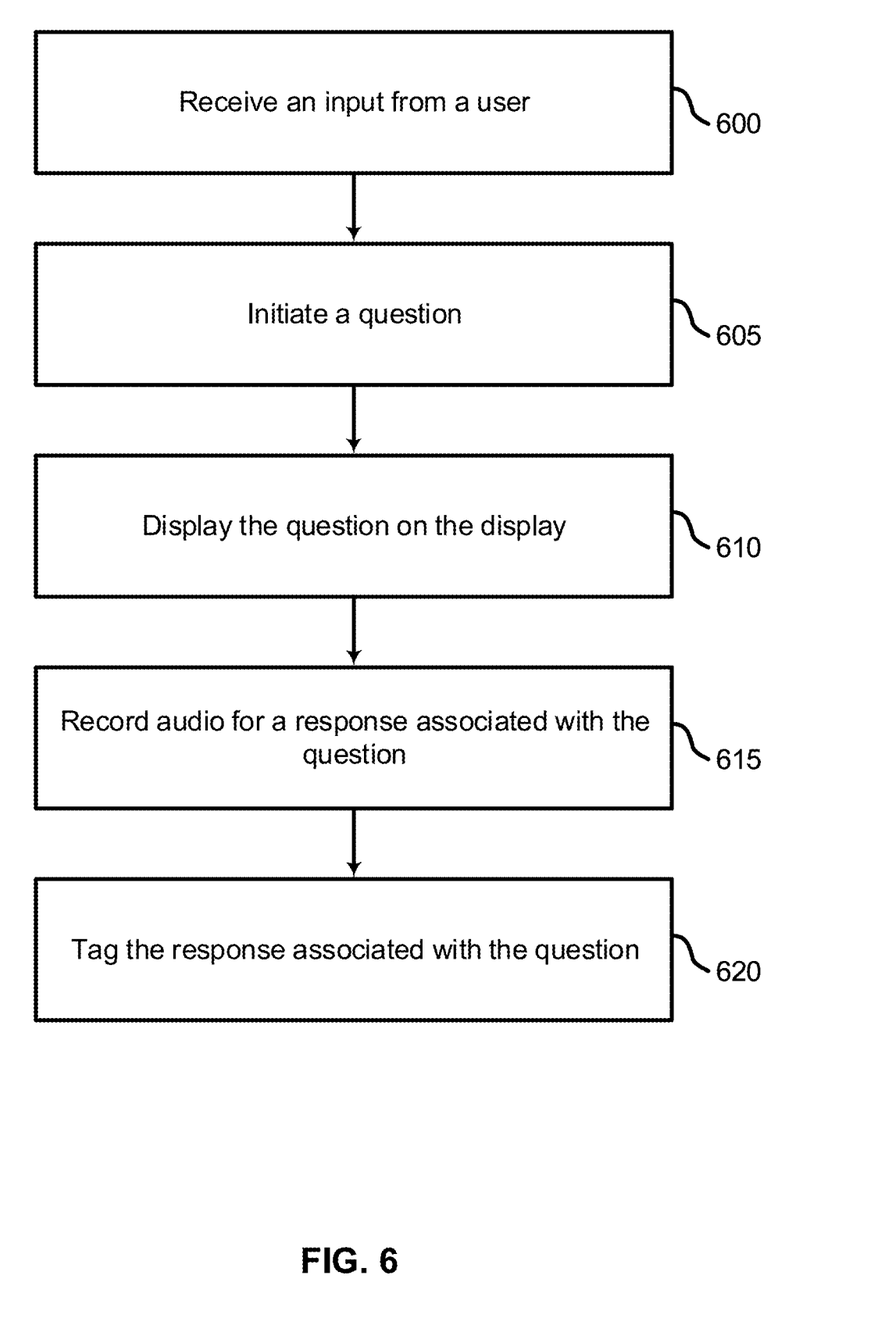

FIG. 6 shows an example of an audio recording process according to aspects of the present disclosure. Specifically, FIG. 6 illustrates an example embodiment in which an audio processing system initiates a question in response to an input from a user.

In some examples, these operations may be performed by a system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 600, the system receives an input from a user. For example, a user may click a button to proceed to a next question. In some cases, the operations of this step may be performed by a network component as described with reference to FIG. 2.

At operation 605, the system initiates a question of the set of questions. In some cases, the operations of this step may be performed by a question component as described with reference to FIG. 2.

At operation 610, the system displays the question on the display. In some cases, the operations of this step may be performed by a display as described with reference to FIG. 2.

At operation 615, the system records audio for a response associated with the question. In some cases, the operations of this step may be performed by an audio communications terminal as described with reference to FIG. 2.

At operation 620, the system tags the response associated with the question. In some cases, the operations of this step may be performed by a tagging system as described with reference to FIG. 2.

Figure 7:
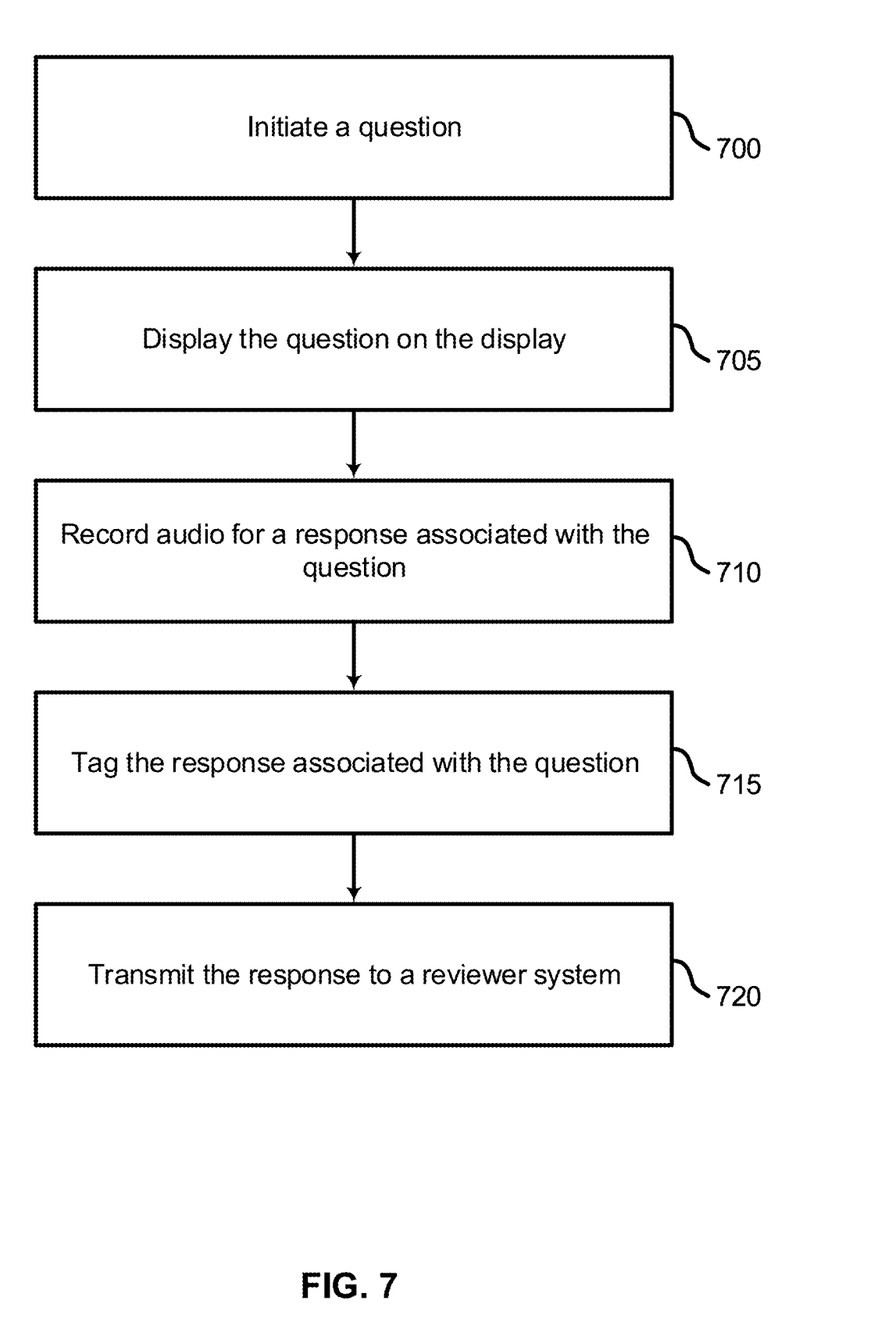

FIG. 7 shows an example of an audio recording process according to aspects of the present disclosure. Specifically, FIG. 7 illustrates an example embodiment in which an audio processing system transmits a response to a reviewer system.

In some examples, these operations may be performed by a system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 700, a user initiates a question of the set of questions. In some cases, the operations of this step may be performed or detected by a question component as described with reference to FIG. 2.

At operation 705, the system displays the question on the display. In some cases, the operations of this step may be performed by a display as described with reference to FIG. 2.

At operation 710, the system records audio for a response associated with the question. In some cases, the operations of this step may be performed by an audio communications terminal as described with reference to FIG. 2.

At operation 715, the system tags the response associated with the question. In some cases, the operations of this step may be performed by a tagging system as described with reference to FIG. 2.

At operation 720, the system transmits the response to a reviewer system. In some cases, the operations of this step may be performed by a network component as described with reference to FIG. 2.

Figure 8:
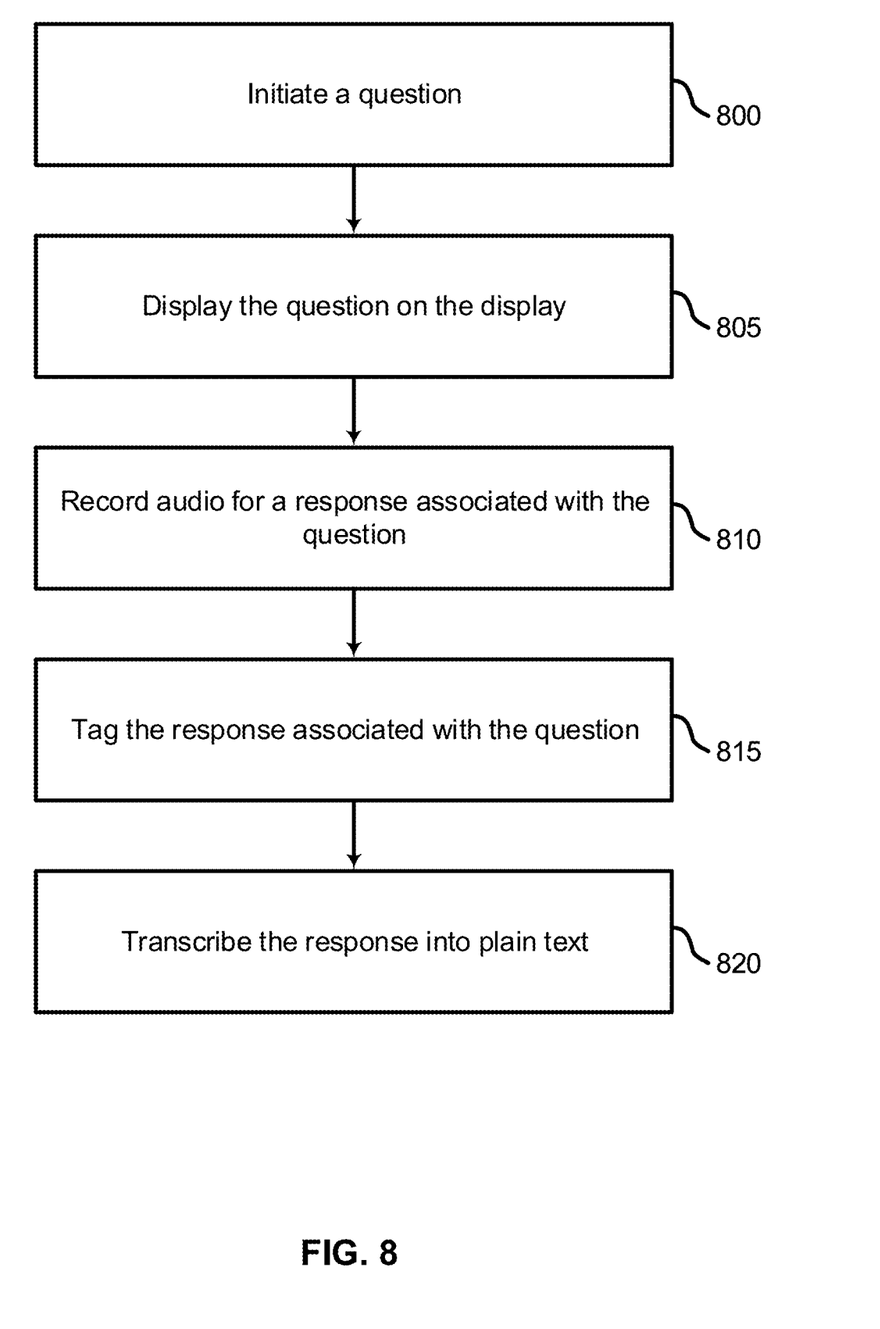

FIG. 8 shows an example of an audio recording process according to aspects of the present disclosure. Specifically, FIG. 8 illustrates an example embodiment in which an audio processing system transcribes a response (e.g., into plain text).

In some examples, these operations may be performed by a system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 800, a user initiates a question of the set of questions. In some cases, the operations of this step may be performed or detected by a question component as described with reference to FIG. 2.

At operation 805, the system displays the question on the display. In some cases, the operations of this step may be performed by a display as described with reference to FIG. 2.

At operation 810, the system records audio for a response associated with the question. In some cases, the operations of this step may be performed by an audio communications terminal as described with reference to FIG. 2.

At operation 815, the system tags the response associated with the question. In some cases, the operations of this step may be performed by a tagging system as described with reference to FIG. 2.

At operation 820, the system transcribes the response (e.g., into plain text or another suitable text format). In some cases, the operations of this step may be performed by a transcription component as described with reference to FIG. 2.

Figure 9:
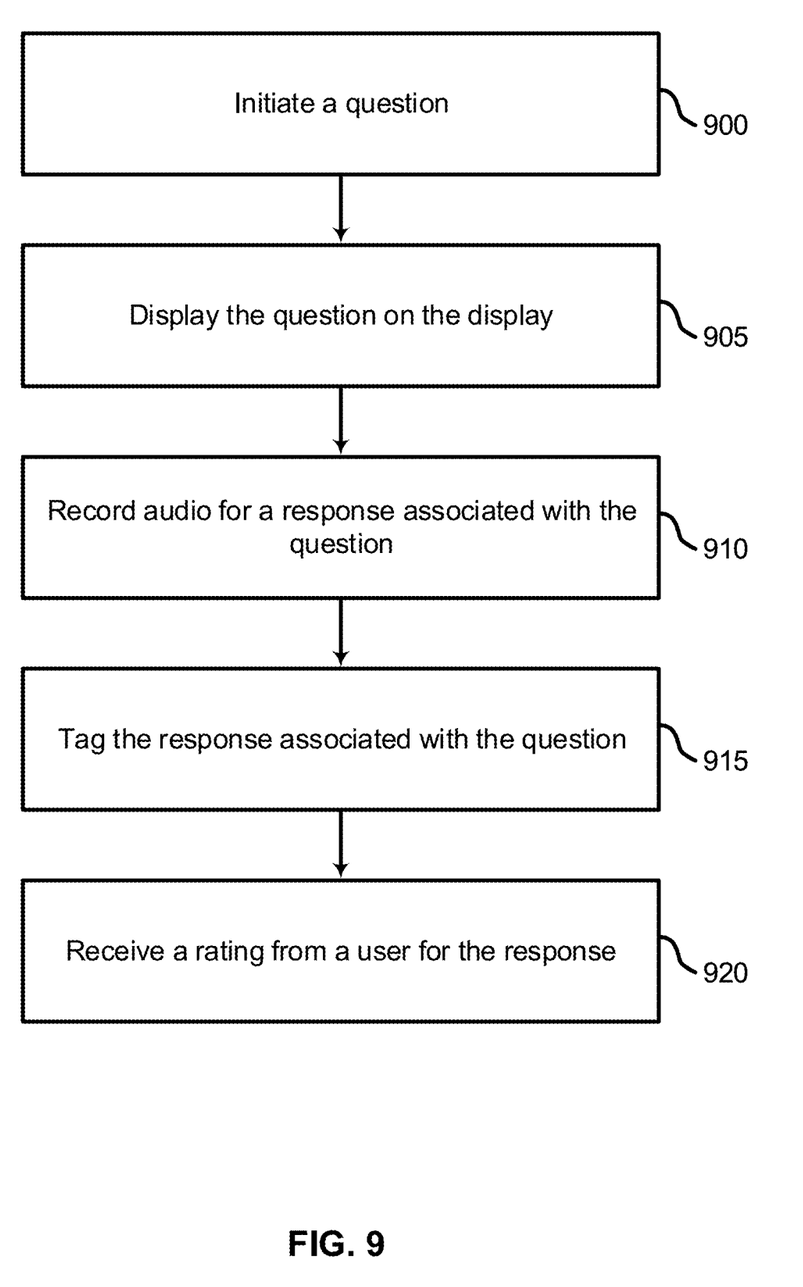

FIG. 9 shows an example of an audio recording process according to aspects of the present disclosure. Specifically, FIG. 9 illustrates an example embodiment in which an audio processing system receives a rating from a user for each response (e.g., to an interview question).

In some examples, these operations may be performed by a system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 900, a user initiates a question of the set of questions. In some cases, the operations of this step may be performed or detected by a question component as described with reference to FIG. 2.

At operation 905, the system displays the question on the display. In some cases, the operations of this step may be performed by a display as described with reference to FIG. 2.

At operation 910, the system records audio for a response associated with the question. In some cases, the operations of this step may be performed by an audio communications terminal as described with reference to FIG. 2.

At operation 915, the system tags the response associated with the question. In some cases, the operations of this step may be performed by a tagging system as described with reference to FIG. 2.

At operation 920, the system receives a rating from a user for the response. In some cases, the rating is received prior to initiating a next question. In some cases, the rating is received after all of the questions or responses have been received. In one example, the rating comprises an emoticon, emoji, or another symbol indicative of a user rating. In some cases, the operations of this step may be performed by a rating component as described with reference to FIG. 2.

Referring next to FIG. 10, an exemplary graphical interface display 1000 of a user terminal is shown. The interface display 1000 shows an example of an interactive graphical display shown to the interviewer on the display 205 during the recording process. In the embodiment of FIG. 10, the graphical interface display 1000 is displayed in a web browser, although the display 1000 may be part of a stand-alone computing device application (i.e. not viewed via a web browser).

In the example display 1000, the interview is already in progress. A plurality of questions are shown in a list, including a first question 1005, a second question 1010, and a third question 1015. The second question 1010 is the currently active question, as indicated in the display 1000 as being darker compared to the inactive questions (e.g. question 1 and question 3). This means that the audio being recorded will be associated with and tagged for the second question 1010. Other graphical indications could be used to indicate which question is active. In some embodiments only the active question is shown on the display 1000.

Question controls 1020 are shown in the display 1000 as being associated with the active second question 1010. An emoji selection 1030 is also shown in association with the active second question 1010. The question controls 1020 and emoji selection 1030 are shown for each active question only (e.g. when the previous first question 1005 was active, the question control 1020 and the emoji selection 1030 were shown associated with the first question only and not any of the subsequent questions).

The question controls 1020 include a "previous" button and a "next" button. In response to selecting by the interviewer of the "previous" button returns the active question to the previous question (in this example to the first question 1005 and the recording after selection of the "previous" button would be associated with the previous question. In response to the selecting by the interviewer of the "next" button advances the active question to the next question in the list. Selecting the next question changes the association for the recorded audio from the currently active question to the next question on the list and updates the display to indicate that the next question is active. In this example, selecting "next" would change the active question from the second question 1010 to the third question 1115.

While a question is active, the interviewer may select one of the emojis shown in the emoji selection 1030 in association with the active question. In response to the interviewer selecting the emoji, that emoji is associated with the recorded response to the active question.

Also shown on the display 1000 are the recording controls 1025. In response to selecting one of the recording controls 1025, the system starts, stops, or pauses the audio recording.

Also shown on the display 1000 is an interviewee profile 1035. The interviewee profile 1035 displays information stored in the system regarding the interviewee and other details of the current recording session.

Also shown on the display 1000 is a recording duration 1040. The recording duration 1040 shows how long the recording is so far.

Also shown on the display 1000 is an interview in progress indicator 1045. The interview in progress indicator 1045 graphically indicates to the interviewer that the interview recording is in progress.

Accordingly, the present disclosure includes at least the following embodiments.

A method for segmenting an audio recording is described. Embodiments of the method may include initiating a question of the plurality of questions, displaying the question on the display, recording audio for a response associated with the question, tagging the response associated with the question, and repeating the steps for each of the plurality of questions.

An apparatus for audio processing is described. The apparatus may include a processor, memory in electronic communication with the processor, and instructions stored in the memory. The instructions may be operable to cause the processor to initiate a question of the plurality of questions, display the question on the display, record audio for a response associated with the question, tag the response associated with the question, and repeat the steps for each of the plurality of questions.

A non-transitory computer readable medium storing code for audio processing is described. In some examples, the code comprises instructions executable by a processor to: initiate a question of the plurality of questions, display the question on the display, record audio for a response associated with the question, tag the response associated with the question, and repeat the steps for each of the plurality of questions.

A system is described. The system may include a display, a user input device, an audio communications terminal for sending and receiving audio messages, a recording medium coupled to the audio communications terminal for recording audio messages received via the audio communications terminal, a tagging system coupled to the recording medium for tagging each of the messages recorded on the recording medium as a function of a question with which each of the messages recorded on the recording medium is associated, and a processor coupled to the display, user input device, recording medium and tagging system, wherein the processor comprises code for performing the following steps for each question of a plurality of questions: initiate a question of the plurality of questions, display the question on the display, record audio for a response associated with the question, tag the response associated with the question, and repeat the steps for each of the plurality of questions.

Some examples of the method, apparatus, non-transitory computer readable medium, and system described above may further include recording audio for the question, wherein repeating the steps includes repeating the recording of the audio for the question. Some examples of the method, apparatus, non-transitory computer readable medium, and system described above may further include sending an audio message associated with the question, wherein repeating the steps includes repeating the audio message.

Some examples of the method, apparatus, non-transitory computer readable medium, and system described above may further include receiving an input from a user, wherein the audio is recorded in response to receiving the input. Some examples of the method, apparatus, non-transitory computer readable medium, and system described above may further include receiving an input from a user, wherein the response is tagged in response to receiving the input.

Some examples of the method, apparatus, non-transitory computer readable medium, and system described above may further include transmitting the response to a reviewer system. Some examples of the method, apparatus, non-transitory computer readable medium, and system described above may further include transcribing the response into plain text. Some examples of the method, apparatus, non-transitory computer readable medium, and system described above may further include searching for at least one keyword in a transcription generated in response to the transcription.

Some examples of the method, apparatus, non-transitory computer readable medium, and system described above may further include receiving a rating from a user for the response, wherein the rating is received after a last question is received. Some examples of the method, apparatus, non-transitory computer readable medium, and system described above may further include receiving a rating from a user for the response, wherein the rating is received after a last response is received. Some examples of the method, apparatus, non-transitory computer readable medium, and system described above may further include receiving a rating from a user for the response, wherein the rating comprises an emoticon or an emoji.

In some examples, the response is tagged using a markup language index generator for generating a markup language index comprising tagging information. In some examples, the recording comprises continuously recording the audio for each respective response associated with each of the plurality of questions.

The functions of the graphical display interface 1000 are carried out by an audio processing system. In some embodiments the functions are carried out by the audio processing system of FIG. 1. In some embodiments the user terminal 105 receives the user inputs and sends the user inputs to the server. The server then updates the recording session accordingly and updates the graphical interface accordingly (e.g. if the interviewer selects "next", the server receives the selection, changes the recording association to the next question, and sends instructions to the terminal to update the display to indicate that the next question is now the active question.) It will be understood that the software and applications performing the functions may be located either on the terminal or on the server.

Some of the functional units described in this specification have been labeled as modules, or components, to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A system comprising:
a display for an interviewer;
a user input device for the interviewer;
an audio communications terminal for sending and receiving audio;
a recording medium coupled to the audio communications terminal for recording audio received via the audio communications terminal;
a tagging system coupled to the recording medium for tagging audio segments recorded on the recording medium as a function of a question with which each audio segment recorded on the recording medium is associated; and
a processor coupled to the display, user input device, recording medium, audio communications terminal, and tagging system, wherein the processor comprises code for performing the following steps:
placing an audio call from the interviewer to an interviewee via the audio communications terminal, wherein upon answering of the audio call by the interviewee, the interviewer and the interviewee are continuously connected via audio in real-time, wherein the audio call comprises continuous receiving of audio from the interviewee for the duration of the audio call;
initiating recording of the audio call;
during the audio call, initiating a first question of a pre-determined list of questions as being a currently active question, wherein the list of questions has an order;
during the audio call, displaying an indication of the currently active question on the display to the interviewer;
during the audio call, recording the interviewee via the audio communications terminal audio for a response associated with the currently active question;
during the audio call, receiving an indication from the interviewer, via the input device, for finishing the response;
in response to receiving the indication for finishing the response, advancing to the next question in the list of questions, whereby the next question is initiated as the currently active question;

in response to receiving the indication for finishing the response, directing the tagging system to tag an audio segment recorded between the initiation of the previously active question and the indication for finishing the response as being associated with the previously active question, whereby the response given during the audio segment is associated with the question active during that audio segment; and during the audio call, for each remaining question of the list of questions during the same audio call between the interviewer and the interviewee, repeating the steps of displaying the indication of the currently active question, recording the interviewee, receiving the indication from the interviewer for finishing the response, advancing to the next question, and tagging the audio segment, whereby the plurality of recorded interviewee audio segments are tagged during the audio call.

2. The system of claim 1, further comprising said processor, wherein said processor further comprises code for recording via the audio communications terminal audio for a respective question associated with one of the questions of the list of questions, and wherein said repeating includes repeating the recording of the audio for the respective question for each question of the list of questions.

3. The system of claim 1, further comprising said audio communications terminal, wherein said audio communications terminal sends a respective audio message associated with one of said questions of the list of questions, and wherein said repeating includes repeating the respective audio message for each question of the list of questions.

4. The system of claim 1, wherein each directing of the tagging system to tag the audio segment associated with the one of the questions of the list of questions is in response to a respective input from the interviewer.

5. The system of claim 1, further comprising a network adaptor, wherein the network adaptor is configured to transmit each audio segment having been tagged via a communications network to a reviewer system.

6. The system of claim 1, further comprising an audio transcriber configured to automatically transcribe each audio segment tagged by said tagging system into plain text.

7. The system of claim 6, search engine configured to search for at least one keyword in a transcription generated in response to said automatically transcribing.

8. The system of claim 1, further comprising a rating device for receiving a respective rating from the interviewer for each respective audio segment associated with each respective question of the list of questions, wherein each respective rating is received after each respective audio segment is tagged and before a next respective audio segment is tagged.

9. The system of claim 1, further comprising a rating device for receiving a respective rating from the interviewer for each respective audio segment associated with each respective question of the list of questions, wherein each respective rating is received after a last of said respective audio segments to a last of said respective questions of said list of questions is tagged.

10. The system of claim 1, further comprising a rating device for receiving a respective rating from the interviewer for each respective audio segment associated with each respective question of the list of questions, wherein each respective rating is selected from the group consisting of an emoticon and an emoji.

11. The system of claim 1, wherein said tagging system comprises the recording.

12. The system of claim 1, wherein said recording of the interviewee comprises maintaining a continuous recording during the audio call.

13. A method for audio processing, comprising steps including:

placing an audio call from an interviewer to an interviewee via an audio communications terminal;

answering of the audio call by the interviewee, whereby the interviewer and the interviewee are continuously connected via audio in real-time, wherein the audio call comprises continuous receiving of audio from the interviewee for the duration of the audio call;

initiating recording of the audio call;

during the audio call, displaying an indication of the currently active question on a display to the interviewer;

during the audio call, recording audio of the interviewee for a response associated with the currently active question;

during the audio call, receiving an indication from an interviewer, via the input device, for finishing the response;

in response to receiving the indication for finishing the response, advancing to the next question in the list of questions, whereby the next question is initiated as the currently active question;

in response to receiving the indication for finishing the response, tagging an audio segment recorded between the initiation of the previously active question and the indication for finishing the response as being associated with the previously active question, whereby the response given during the audio segment is associated with the question active during that audio segment; and during the audio call, for each remaining question of the list of questions during the same audio call between the interviewer and the interviewee, repeating the steps of displaying the indication of the currently active question, recording the interviewee, receiving the indication from the interviewer for finishing the response, advancing to the next question, and tagging the audio segment, whereby the plurality of recorded interviewee audio segments are tagged during the audio call.

14. The method of claim 13, further comprising:

recording audio for the respective question, wherein repeating the steps includes repeating the recording of the audio for the respective question for each question of the list of questions.

15. The method of claim 13, further comprising:

sending an audio message associated with the respective question, wherein repeating the steps includes repeating the respective audio message for each question of the list of questions.

16. A non-transitory computer readable medium storing code for audio processing, the code comprising instructions executable by a processor to:

place an audio call from an interviewer to an interviewee via an audio communications terminal, wherein upon answering of the audio call by the interviewee, the interviewer and the interviewee are continuously connected via audio, wherein the audio call comprises continuous receiving of audio from the interviewee in real-time for the duration of the audio call;

initiate recording of the audio call;

during the audio call, display an indication of the currently active question on a display;

during the audio call, record audio of the interviewee for a response associated with the currently active question;

during the audio call, receive an indication from an interviewer, via the input device, for finishing the response;

in response to receiving the indication for finishing the response, advance to the next question in the list of questions, whereby the next question is initiated as the currently active question;

in response to receiving the indication for finishing the response, tag an audio segment recorded between the initiation of the previously active question and the indication for finishing the response as being associated with the previously active question, whereby the response given during the audio segment is associated with the question active during that audio segment; and during the audio call, for each remaining question of the list of questions during the same audio call between the interviewer and the interviewee, repeat the steps of displaying the indication of the currently active question, recording the interviewee, receiving the indication from the interviewer for finishing the response, advancing to the next question, and tagging the audio segment, whereby the plurality of recorded interviewee audio segments are tagged during the audio call.

17. The non-transitory computer readable medium of claim 16, the code further comprising instructions executable by the processor to:

record audio for the respective question, wherein repeating the steps includes repeating the recording of the audio for the respective question for each question of the list of questions.

18. The non-transitory computer readable medium of claim 16, the code further comprising instructions executable by the processor to:

send an audio message associated with the respective question, wherein repeating the steps includes repeating the audio message for each question of the list of questions.

* * * * *

UNITED STATES PATENT AND TRADEMARK OFFICE
CERTIFICATE OF CORRECTION

PATENT NO. : 12,327,563 B2  
APPLICATION NO. : 17/184271  
DATED : June 10, 2025  
INVENTOR(S) : O'Reilly Page 1 of 1

It is certified that error appears in the above-identified patent and that said Letters Patent is hereby corrected as shown below:

In the Claims

Claim 7, Column 15, Line 45, delete "search" and insert --a search--.

Claim 13, Column 16, Line 16, delete "during the audio call," and insert --during the audio call, initiating a first question of a pre-determined list of questions as being a currently active question, wherein the list of questions has an order; during the audio call,--.

Claim 16, Column 16, Line 66, delete "during the audio call," and insert --during the audio call, initiating a first question of a pre-determined list of questions as being a currently active question, wherein the list of questions has an order; during the audio call,--.

Signed and Sealed this  
Fifth Day of August, 2025

Coke Morgan Stewart  
*Acting Director of the United States Patent and Trademark Office*